United States Patent
Macke et al.

(10) Patent No.: US 7,284,642 B2
(45) Date of Patent: Oct. 23, 2007

(54) DISC BRAKE, IN PARTICULAR FOR A COMMERCIAL VEHICLE

(75) Inventors: Wlodzimierz Macke, Olching (DE); Florian Beil, Olching (DE)

(73) Assignee: Knorr-Bremse Systeme fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 11/490,027

(22) Filed: Jul. 21, 2006

(65) Prior Publication Data

US 2007/0084680 A1   Apr. 19, 2007

Related U.S. Application Data

(63) Continuation of application No. PCT/EP2005/000309, filed on Jan. 14, 2005.

(30) Foreign Application Priority Data

Jan. 21, 2004   (DE)  ...................... 10 2004 003 083

(51) Int. Cl.
    *F16D 65/00*   (2006.01)
(52) U.S. Cl. .................................. 188/73.44
(58) Field of Classification Search ............ 188/73.44, 188/73.45; 277/212 FB
    See application file for complete search history.

(56) References Cited

U.S. PATENT DOCUMENTS

| | | | | |
|---|---|---|---|---|
| 4,447,066 A | * | 5/1984 | Katagiri et al. ............. | 277/636 |
| 4,557,354 A | * | 12/1985 | Sakakibara ............... | 188/73.45 |
| 4,678,064 A | * | 7/1987 | Adachi et al. ............ | 188/73.45 |
| 4,926,979 A | * | 5/1990 | Odaka ...................... | 188/73.44 |
| 5,036,957 A | * | 8/1991 | Fouilleux et al. ......... | 188/73.44 |
| 5,161,651 A | | 11/1992 | Weiler et al. | |
| 5,765,837 A | * | 6/1998 | Schwarzler ................. | 277/636 |
| 6,039,156 A | | 3/2000 | Schneider | |
| 6,402,999 B1 | * | 6/2002 | Sadr et al. ..................... | 264/68 |

FOREIGN PATENT DOCUMENTS

EP         0 831 242 A2     3/1998

OTHER PUBLICATIONS

International Search Reported dated Apr. 5, 2005.

* cited by examiner

*Primary Examiner*—Christopher P. Schwartz
(74) *Attorney, Agent, or Firm*—Crowell & Moring LLP

(57) ABSTRACT

The invention relates to a disc brake, especially for a utility vehicle, said disc brake comprising a caliper which is provided with a brake disc able to interact with brake linings and is fixed to a brake anchor plate in such a way that it can be axially displaced in relation to the brake disc. To this end, guiding struts on which the caliper is guided are fixed to the brake anchor plate, each guiding strut being enveloped by bellows fixed on both sides, in the region formed between the caliper and the brake anchor plate. The inventive disc brake is embodied in such a way that the peripheral head regions of the folds of the bellows facing the guiding strut have a peripheral contour deviating from the circumference of the guiding strut.

18 Claims, 3 Drawing Sheets

DISC BRAKE, IN PARTICULAR FOR A COMMERCIAL VEHICLE

CROSS-REFERENCE TO RELATED APPLICATIONS

This application is a continuation of PCT International Application No. PCT/EP2005/000309, filed on Jan. 14, 2005, which claims priority under 35 U.S.C. §119 to German Application No. 10 2004 003 083.9, filed Jan. 21, 2004, the entire disclosures of which are expressly incorporated by reference herein.

BACKGROUND AND SUMMARY OF THE INVENTION

The present invention relates to a disc brake, in particular for a commercial vehicle having a brake caliper and a brake disc, which brake disc can be placed in active contact with brake pads. The caliper is fastened to a brake carrier so as to be axially displaceable relative to the brake disc, for which purpose guide pins are fixedly connected to the brake carrier. The brake caliper is guided on the guide pins, wherein each guide pin is enclosed, in the region formed between the brake caliper and the brake carrier, by a bellows which is fixed at both sides.

In disc brakes of the above-mentioned type, the brake caliper is connected to the brake carrier, which is connected to the vehicle, by way of fastening elements which have guide pins. Here, the guide pins engage at one side in the brake carrier, while at the other side, they are guided in sliding bearings of the brake caliper in such a way that an axial displacement of the brake caliper is possible on the positionally fixed brake carrier.

To protect the guide pins, in particular to prevent dirt accumulation, the associated guide pin is enclosed by a bellows in the respective region between the brake carrier and the brake caliper. On account, predominantly, of a lack of space, the bellows is dimensioned to be as small as possible, so that it bears closely against the guide pin, wherein the peripheral head regions of the folds which face toward the guide pin function practically as sealing lips, producing hermetically sealed-off chambers in each case as a result.

During a slow movement of the brake caliper, as occurs during re-adjustment of the brake carrier on account of wear, the quantity of air enclosed in the bellows is equalized corresponding to the change in volume by way of diffusion, that is to say air molecules permeate through the wall of the bellows in one or the other direction, so that no high pressure or vacuum results in the chambers which are formed. Here, the number of folds and their height are dependent on the working stroke which is to be performed by the disc brake.

When the brake caliper is displaced away from the brake carrier, the bellows adheres to the bar as a result of the vacuum which is produced, wherein the close-fitting peripheral head regions, which undesirably form sealing lips, of the folds which face toward the guide pin form vacuum chambers, which are independent of one another.

When the brake caliper is displaced in the opposite direction, that is to say toward the brake carrier, the vacuum formed in the first chamber which faces toward the brake caliper is reduced as a result of the displacement, wherein the fold is relieved of load and the bellows can fold together again in that region. The subsequent chambers, in contrast, remain adhered as a result of the vacuum, and are no longer folded. As a result, during the continued axial displacement of the brake caliper, the bellows is, so to speak, folded around and is pulled into the guide bore of the brake caliper, so that, in some circumstances, the bellows is damaged, which can lead to failure of the brake.

The present invention is, therefore, based on the object of further developing a disc brake of the above-mentioned type such that, using structurally simple means, function-related damage to the bellows is eliminated, and the operational reliability of the disc brake is improved overall.

This and other objects are achieved by providing a disc brake having a brake caliper and a brake disc, which brake disc can be placed in active contact with brake pads. The caliper is fastened to a brake carrier so as to be axially displaceable relative to the brake disc, for which purpose guide pins are fixedly connected to the brake carrier. The brake caliper is guided on the guide pins, wherein each guide pin is enclosed, in the region formed between the brake caliper and the brake carrier, by a bellows which is fixed at both sides. The peripheral head regions of those folds of the bellows, which face toward the guide pin, have a circumferential contour which is different to the circumference of the guide pin.

The modification to the bellows, which is additionally possible with little additional production expenditure, actively prevents the possibility of a vacuum, as a result of which the wall of the bellows would bear largely with its entire surface against the guide pin, not being produced in the separately formed chambers.

In addition, there is pressure equalization between the individual chambers, so that the bellows can permanently perform its intended function in an unrestricted fashion.

A displacement of the brake caliper in the direction of the brake carrier leads to a reduction of the vacuum not only in the first chamber, which is adjacent to the brake caliper, but rather in the entire space enclosed by the bellows. This ensures that the bellows folds uniformly in a functional manner, so that it is prevented from being damaged as described with regard to the prior art.

As a result of the circumferential contour of the head regions of the fold, which face toward the guide pin, being different from the preferably circular circumference of the guide pin, gap formation is partially obtained. As a result, a one-chamber system is practically formed with regard to pressure equalization and/or the exchange of air. This prevents the formation of sealing lips which bear against the guide pin in a continuous fashion.

According to an advantageous refinement of the invention, it is provided that the corresponding peripheral head region of each fold is provided with at least one knob, which bears against the guide pin and additionally spaces the folds apart from the guide pin while forming a gap. Here, pressure equalization is obtained by way of the gap which is formed.

The pressure equalization may also be obtained if, instead of the knob, which constitutes a positive formation, a comparable cut-out, which in contrast forms a negative formation, is provided in the head region of the respective fold. The cut-out provides a flow passage between two adjacent chambers.

If required, a plurality of knobs or cut-outs may also be provided more or less uniformly over the circumference.

Another circumferential contour, which is different from the circumferential contour of the guide pin, of the head regions of the folds is also templated, for example in the form of a polygon, in which the sides of the polygon bear against the guide pin, while the formed corner region provide the desired passage.

The same effect is obtained with an oval contouring, which likewise leads to gap formation relative to the round circular contour of the guide pin, specifically at two opposite end regions, wherein it is sufficient for the greatest dimension of the contour of the head region to be kept slightly larger than the smallest dimension, which is associated with the head region and by way of which the corresponding fold bears against the guide pin.

It is to be noted in any case that those head regions of the bellows which are associated with the guide pin do not bear completely against the outer face of the guide pin during deformation.

Other objects, advantages and novel features of the present invention will become apparent from the following detailed description of the invention when considered in conjunction with the accompanying drawings.

DETAILED DESCRIPTION OF THE DRAWINGS

Figure 1:
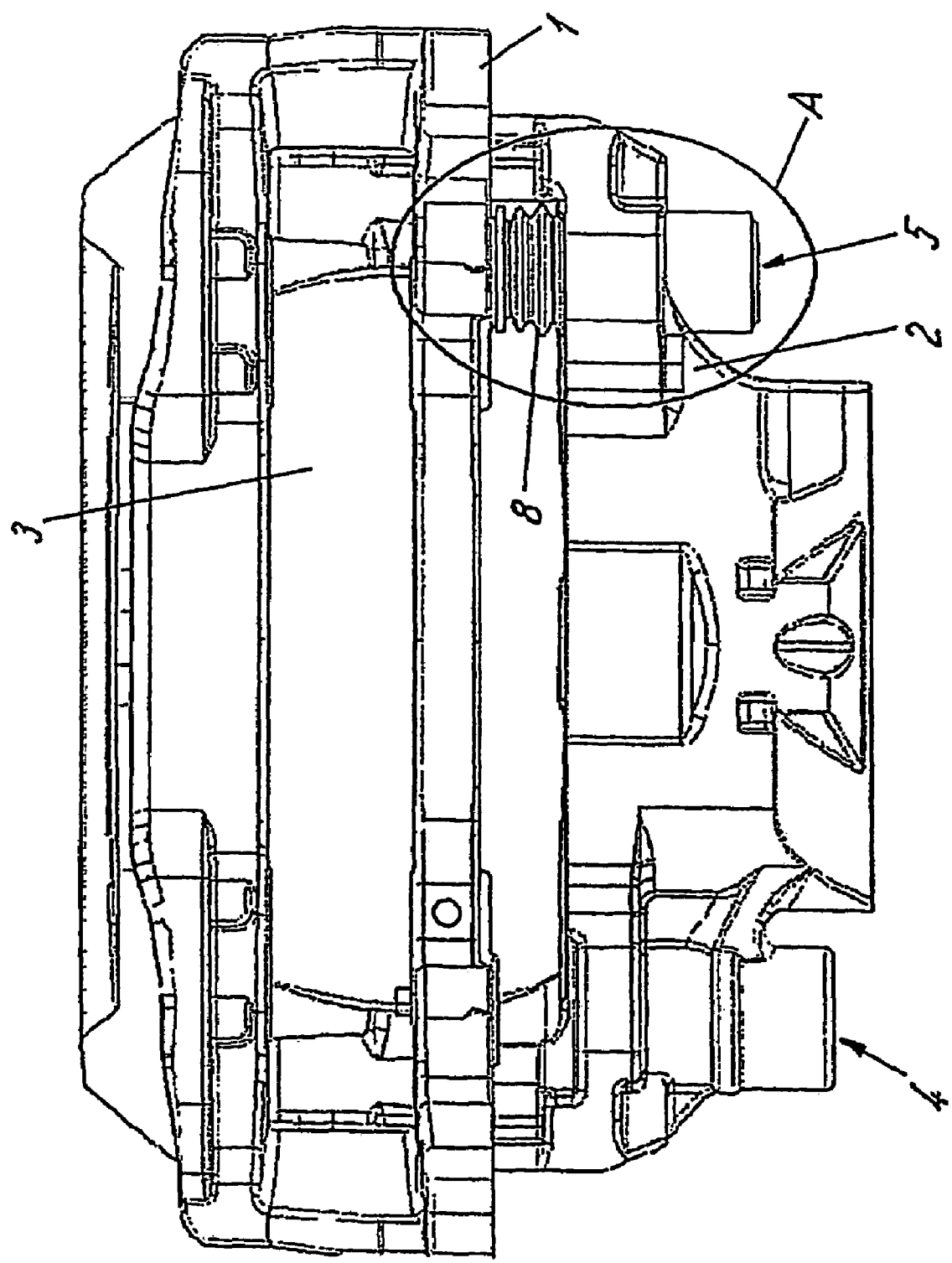
FIG. 1 shows a disc brake according to the invention in a schematic plan view.

FIG. 1 illustrates a disc brake, in particular for a commercial vehicle, which in terms of its basic design has a brake caliper 2 which straddles a brake disc 3. The brake disc is fastened to an axle (not illustrated) of a commercial vehicle.

The brake caliper 2 is mounted on a brake carrier 1 of the commercial vehicle so as to be axially displaceable relative to the brake disc 3. For this purpose, two fastening elements 4, 5 are provided, one of which is preferably formed as a fixed bearing and the other of which is preferably formed as a floating bearing.

Figure 2:
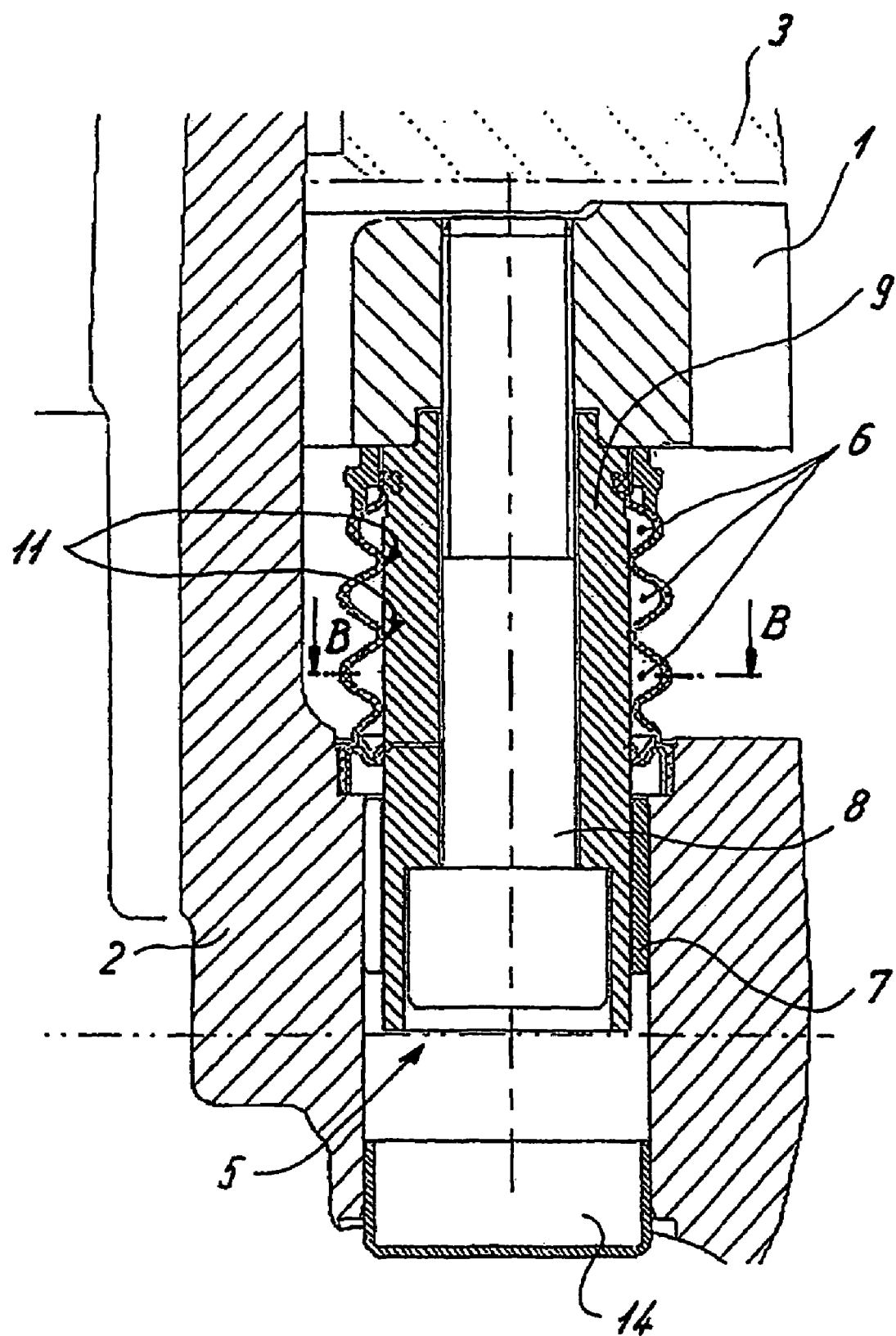
FIG. 2 shows a partial detail of the disc brake according to the label A in FIG. 1.

Each fastening element 4, 5 has a guide pin 9 (FIG. 2), which is fastened to the brake carrier 1 by way of a screw 8, and is mounted in a sliding bearing 7 which is arranged in the brake caliper 2.

A cover 14 is inserted in a bore of the brake caliper 2, on that side of the bore which faces away from the brake carrier 1. The bore holds the sliding bearing 7, by which cover 14 the fastening element is practically hermetically sealed off from the outer region, while a hermetic seal is formed in the inner region of the disc brake by way of a bellows 10. On the guide pin 9, the bellows 10 encloses the region formed between the brake carrier 1 and the brake caliper 2.

Here, the bellows 10 is fixedly connected, at its side which faces toward the brake carrier 1, to the guide pin 9, while being fixedly connected oppositely to the brake caliper 2, so that during an axial displacement of the brake caliper 2 on the guide pin 9, the bellows 10, which additionally consists of an elastic material, is pulled apart or pushed together.

The peripheral head regions 11, which face toward the guide pin 9, bear against the guide pin 9 in regions. The bellow folds in each case form the delimitation for a chamber 6.

According to the invention, however, the circumferential contour of the peripheral head regions 11 is different from the circumference of the guide pin 9. Corresponding exemplary embodiments are shown in FIGS. 3 and 4.

Figure 3:
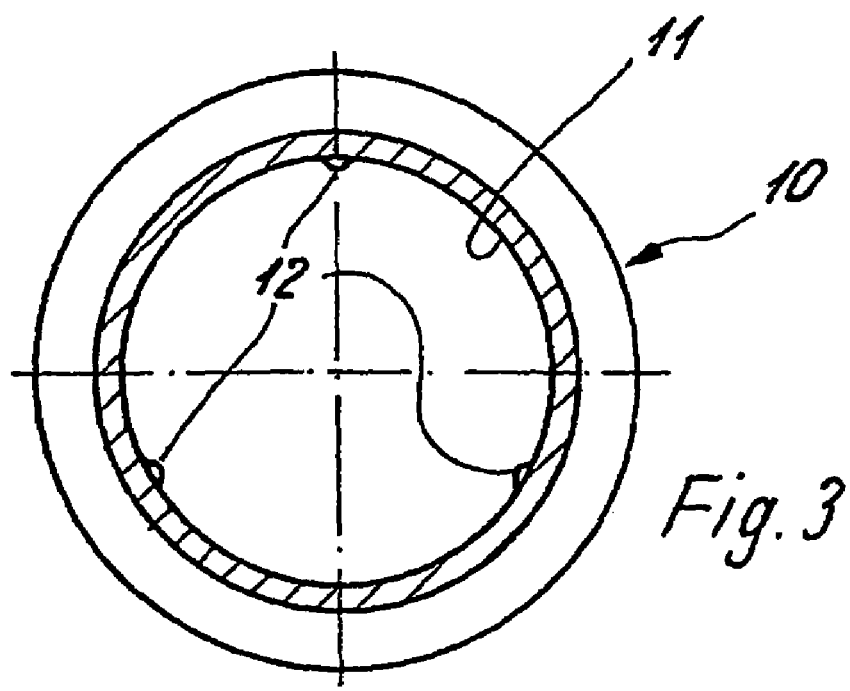
FIGS. 3 and 4 each show a cross-section through a bellows of the disc brake corresponding to the section line B-B in FIG. 2.

In the example illustrated in FIG. 3, inwardly directed knobs 12 are provided so as to be distributed over the circumference of the head region 11, by which knobs 12 the folds and, therefore, the entire bellows 10 bear against the guide pin 9. A gap region formed between two knobs 12 results in a connection of one chamber 6 to the adjacent chamber, so that there is pressure equalization between all of the chambers 6.

Figure 4:
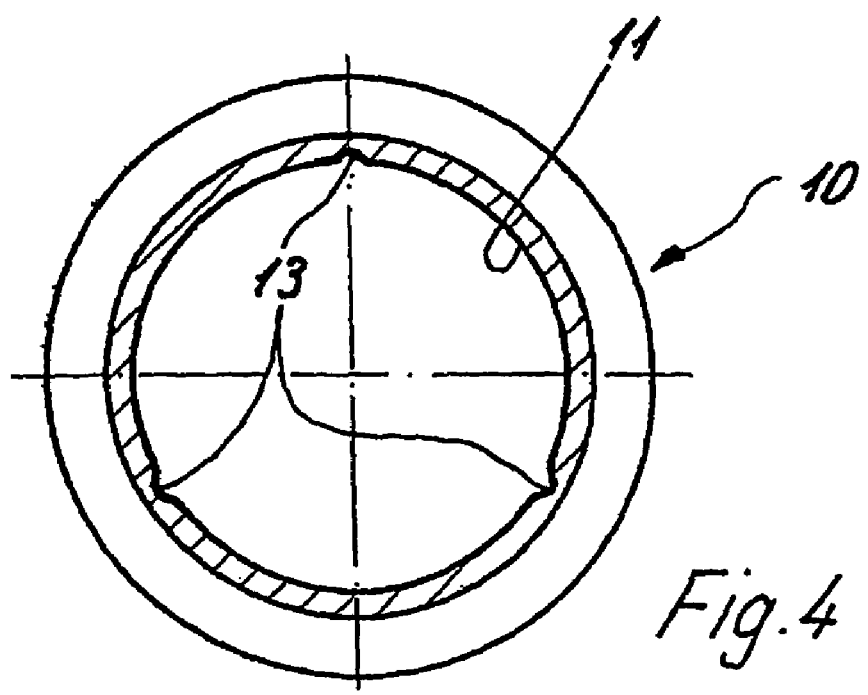

The exemplary embodiment according to FIG. 4 shows cut-outs 13 in the head region 11, which cut-outs 13 are directed radially outward proceeding from the guide bar 9 and form the mentioned passage for pressure equalization, while the head region 11 of the corresponding fold otherwise bears against the guide pin 9.

TABLE OF REFERENCE NUMBERS

1 Brake carrier
2 Brake caliper
3 Brake disc
4 Fastening element
5 Fastening element
6 Chamber
7 Sliding sleeve
8 Screw
9 Guide bar
10 Bellows
11 Head region
12 Knob
13 Cut-out
14 Cover The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A disc brake for a commercial vehicle, comprising:
   a brake caliper which, in use, straddles a brake disc;
   a brake carrier;
   at least one guide pin fixably connected to the brake carrier, the brake caliper being guided on the at least one guide pin so as to be axially displaceable relative to the brake disc;
   a bellows enclosing the guide pin in a region formed between the brake caliper and the brake carrier, the bellows being fixed at both ends; and
   wherein peripheral head regions of folds of the bellows facing toward the guide pin have a circumferential contour which differs from a circumference of the guide pin.

2. The disc brake as claimed in claim 1, wherein the head regions bear partially against the guide pin.

3. The disc brake as claimed in claim 2, wherein the head regions define an oval contour.

4. The disc brake as claimed in claim 2, wherein remaining head regions, which have a round circular contour, are in each case provided with at least one knob which bears against an outer face of the guide pin.

5. The disc brake as claimed in claim 2, wherein remaining head regions, which have a round circular contour, are in each case provided with at least one cut-out, by which a passage is connected between two adjacent chambers of the bellows.

6. The disc brake as claimed in claim 1, wherein the head regions define an oval contour.

7. The disc brake as claimed in claim 6, wherein remaining head regions, which have a round circular contour, are in each case provided with at least one knob which bears against an outer face of the guide pin.

8. The disc brake as claimed in claim 6, wherein remaining head regions, which have a round circular contour, are in each case provided with at least one cut-out, by which a passage is connected between two adjacent chambers of the bellows.

9. The disc brake as claimed in claim 1, wherein remaining head regions, which have a round circular contour, are in each case provided with at least one knob which bears against an outer face of the guide pin.

10. The disc brake as claimed in claim 1, wherein remaining head regions, which have a round circular contour, are in each case provided with at least one cut-out, by which a passage is connected between two adjacent chambers of the bellows.

11. The disc brake as claimed in claim 1, wherein a respective contour of the head regions is formed as a polygon.

12. The disc brake as claimed in claim 1, wherein chambers, formed by folds of the bellows, are substantiality the same size.

13. An assembly for use in a commercial disc brake having a brake caliper mounted on a brake carrier via the assembly and being axially displaceable relative to a brake disc, the assembly comprising:
   at least one guide pin adapted to be fixably connectable to the brake carrier;
   a bellows operatively configured to enclose a region of the guide pin extending between the brake caliper and the brake carrier, the bellows being fixable at each end;
   wherein folds of the bellows include peripheral head regions facing toward the guide pin, the peripheral head regions defining a circumferential contour differing from a circumference of the guide pin.

14. The assembly according to claim 13, wherein the peripheral head regions bear only partially against the guide pin.

15. The assembly according to claim 13, wherein the circumferential contour defined by the peripheral head regions is an oval contour.

16. The assembly according to claim 13, further comprising at least one knob formed on a radially interior area of at least one peripheral head region of a fold of the bellows, the at least one knob bearing against an outer surface of the guide pin.

17. The assembly according to claim 13, further comprising at least one cut-out formed in a radially interior area of at least one peripheral head region of at least one fold, the at least one cut-out forming a passage between adjacent chambers of the bellows.

18. A disc brake for a commercial vehicle, comprising:
   a brake caliper which, in use, straddles a brake disc;
   a brake carrier;
   at least one guide pin fixably connected to the brake carrier, the brake caliper being guided on the at least one guide pin so as to be axially displaceable relative to the brake disc; and
   a bellows enclosing the guide pin in a region formed between the brake caliper and the brake carrier, the bellows being fixed at both ends and forming at least two chambers separated by a respective head region of a fold of the bellows, wherein said respective head region provides an air passageway between the at least two chambers, whereby air pressure is equalized between the at least two chambers.

* * * * *